Dec. 5, 1939.       R. MARKHAM       2,182,029
AUTOMOBILE SIGNAL SWITCH
Filed Oct. 21, 1936       2 Sheets-Sheet 1

Inventor:
Ralph Markham
By [signature]
Atty.

Dec. 5, 1939.   R. MARKHAM   2,182,029
AUTOMOBILE SIGNAL SWITCH
Filed Oct. 21, 1936   2 Sheets-Sheet 2

Inventor:
Ralph Markham
By [signature]
Atty.

Patented Dec. 5, 1939

2,182,029

UNITED STATES PATENT OFFICE 2,182,029

AUTOMOBILE SIGNAL SWITCH

Ralph Markham, Chicago, Ill.

Application October 21, 1936, Serial No. 106,807

3 Claims. (Cl. 200—59)

The present invention relates to an automobile signal switch, and is specifically concerned with a device for signalling or indicating the intention of making a turn prior to actually executing the required change in the directon of travel, including means for automatically restoring the normal condition incident to resuming travel in a forward direction after completing the turn.

Devices of this general class as proposed in the past introduce complications of a structural and functional nature which stand in the way of successfully reducing them to practical public use.

My invention furnishes an improved device that may be easily installed in any automobile and put to use without trouble or prohibitive costs. Its operation is simple and reliable, and its structure is sturdy and of an appearance which does not conflict with the design or operation of the corresponding standard parts of an automobile to which it is to be attached.

The new device of my invention comprises, briefly stated, a composite housing for attachment to the steering wheel and steering column of automobiles, one portion being attached to the steering column and being stationary therewith, and the other portion being secured to the steering wheel proper and being rotatable with it. The movable portion of the housing is equipped with self-locking direction push buttons whereby either one or the other of two directional indicating and signalling circuits may be selectively operated for illuminating a corresponding direction indicator, e. g, a suitable light or lights, prior to making a turn. The light or lights remain illuminated during the turning of the steering wheel and are automatically extinguished upon completion of the turn incident to rotating the steering wheel back to normal. This is accomplished by means of yielding or tilting shafts secured to the corresponding push button and switch mechanisms cooperating with a cam-like control structure disposed within the stationary portion of the housing which is secured to the steering column. Upon depressing a push button, the proper direction-indicating circuit is closed, and the corresponding yielding or tilting shaft is operated in a direction toward the cam. The steering wheel is then rotated to execute the turn of the automobile, but the previously actuated self-locking push button remains depressed due to the tilting shaft yielding upon contacting the cam. However, when the steering wheel is rotated back to normal, the tilting shaft contacts the cam in a movement in a direction opposite from the first turning movement of the steering wheel and remains rigid with respect to the cam, thus causing the return of the push button to normal and opening of the signalling circuit.

The above noted objects and others not specifically defined will appear in the course of the following description which is rendered below with reference to the accompanying drawings. In these drawings, Fig. 1 indicates a plan view looking down upon the steering wheel of an automobile and showing one embodiment of my device secured in place;

Like parts are designated by like reference numerals throughout the drawings.

Figure 1:
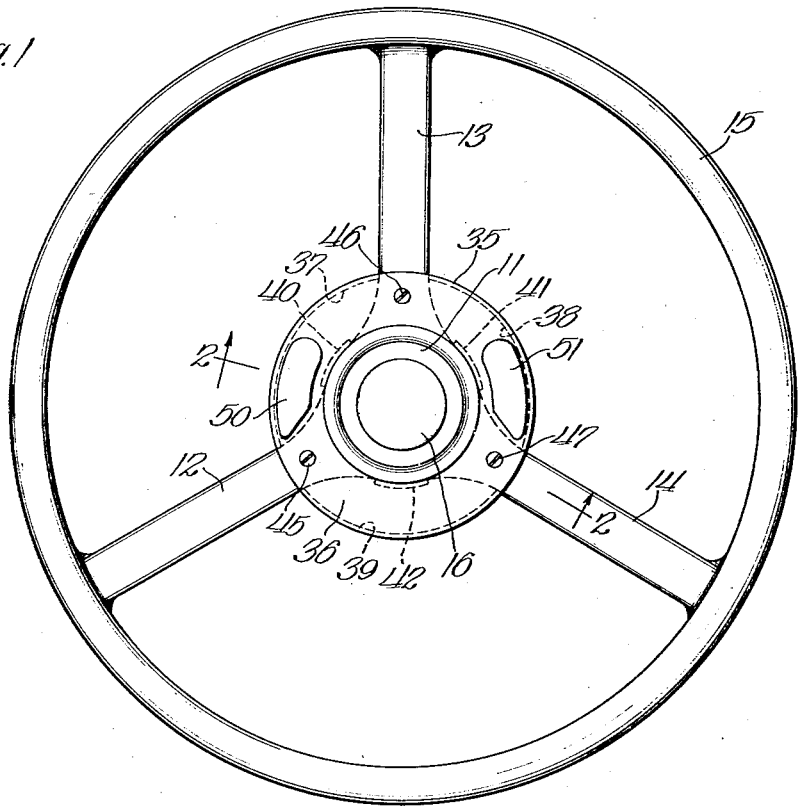

I have indicated in the drawings a conventional type of steering wheel comprising the hub 11 from which radiate the spokes 12, 13, 14 terminating in the circular handle member 15. Numeral 16 indicates the usual horn button which is positioned in the central part of the hub 11. This steering wheel with its hub 11 is rotatable on the stationary steering column 17 in the conventional manner.

Attached to the stationary steering column 17 is the cup-shaped lower portion 20 of the housing containing part of the actuating mechanism of my device. As will be seen particularly from Fig. 3, this lower portion of the housing consists of two parts 21 and 22. The ends of the part 22 are crimped, as indicated at 23 and 24, the ends 25—26 of the portion 21 fitting into the crimped ends 23—24, forming a circular cup-shaped member having a neck 27 (Fig. 2), which may be secured to the stationary column 17 by any suitable and desirable means, for example, by means of a screw such as indicated at 28.

It is understood, of course, that this lower casing may be made of one piece and secured in place on the steering column by slipping the neck 27 over it after removing the hub 11.

Figure 3:
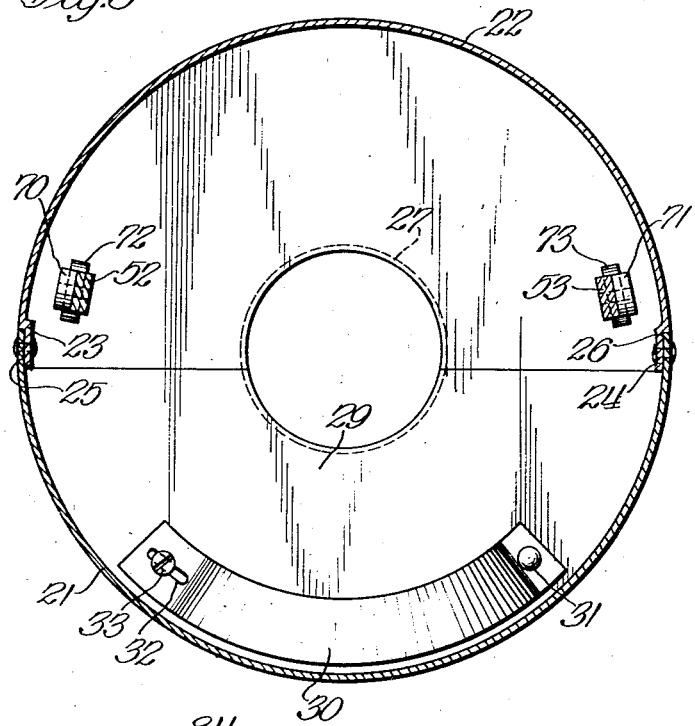
Fig. 3 is a sectional view of the device taken along the line 3—3 of Fig. 2 looking down upon the stationary arcuate cam or control member.

As is particularly indicated in Fig. 3, at the bottom 29 of the lower portion of this housing, on one side and near the periphery, is secured an arcuate cam member 30 which may be made in the form of a leaf spring attached at one end by means of a screw or a rivet 31 and having a slot 32 at the other end adapted to slide along the stem of a suitable fastening member, e. g., a screw 33. This cam 30 will therefore be somewhat yieldable when pressure is exerted thereupon. However, if desired, the cam may be rigidly attached and may also take any desired form other than that shown. The purpose and function of this cam 30 will be presently described in detail.

Figure 2:
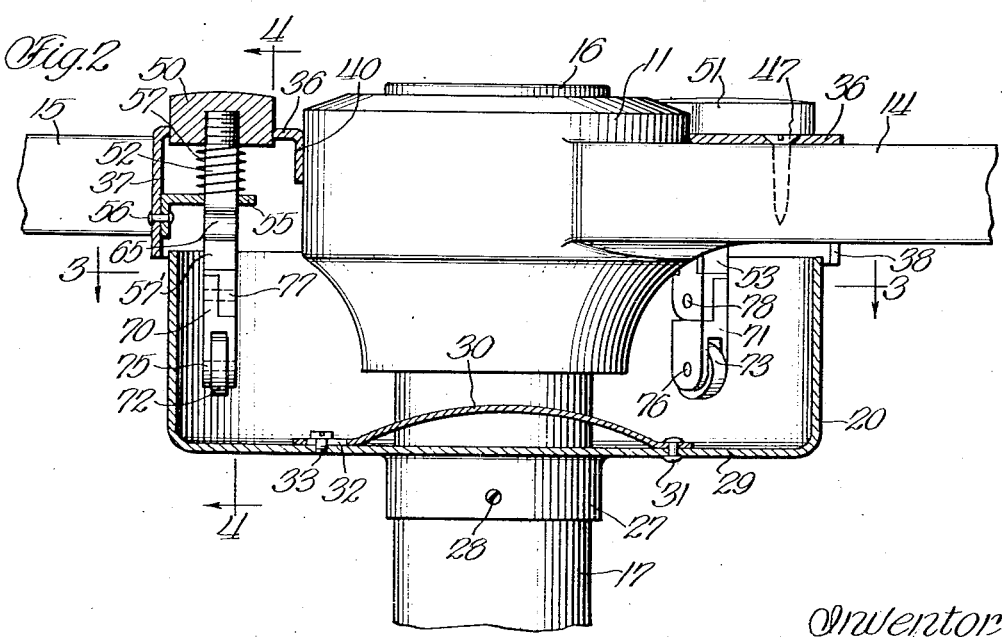
Fig. 2 is a section of my device taken along the line 2—2 of Fig. 1, and shows particularly the actuating mechanism secured to the steering wheel and steering column.

Secured to the hub and to the spokes of the steering wheel proper is the upper portion of the housing, generally indicated in Fig. 1 by the numeral 35. It consists of an upper cover plate 36 (Figs. 2 and 4) with depending outer flanges 37—38—39 and corresponding depending inner flanges 40—41—42 as shown in Figs. 1 and 2. This upper housing portion, therefore, is made in the form of a channel-shaped casing to fit over the hub 11 of the steering wheel, the inner flanges 40—41—42 engaging the hub 11 from the outside. The flat casing portion or cover 36 overlies corresponding parts of the spokes 12—13—14 of the steering wheel, as shown in Fig. 1, and may be attached to the spokes in any convenient manner, for example, by means of the screws shown at 45—46—47. The outer depending flanges 37—38—39 overlie the open end of the cup-shaped lower casing portion, as indicated in Fig. 2. The two casing portions thus form a closed housing, the upper part of which is attached to the steering wheel proper in a suitable manner, e. g., by means of screws as shown, and is rotatable therewith, while the lower part containing the cam 30 is secured to the steering column 17 and is stationary.

Figure 4:
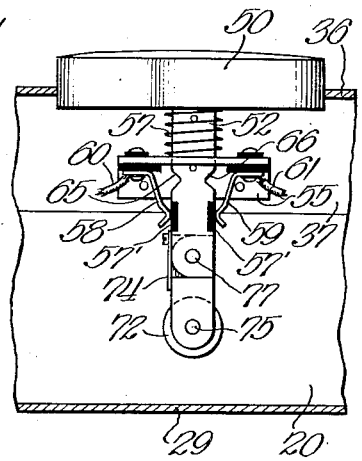
Fig. 4 is a view of the switching mechanism as seen along the line 4—4 of Fig. 2.

Mounted in the rotatable upper portion of the casing and forming part thereof are the switching means comprising two directional selectively operable push buttons 50 and 51 which project from the circular flat casing portion 36, as shown particularly in Figs. 1, 2 and 4, each push button being attached to a shaft such as 52—53, respectively. Each shaft is slidably mounted in a similar manner, and the detailed description of the push button 50 with its shaft 52 and the mounting thereof will suffice for both. This description is best rendered with reference to Figs. 2 and 4.

Secured to the depending wall 37 of the upper casing portion is a bracket 55. The attachment may be made by means of rivets, such as shown at 56. Interposed between the bracket and the bottom of the push button 50 is a spring 57. It will be clear, therefore, that the push button is always biased in an upward direction into the normal position shown in Fig. 2. At numeral 57' is indicated an insulating material provided along part of the shaft 52. Also attached to the bracket 55 are contact members 58—59 which in normal position engage the insulating portion 57', as shown in Fig. 4, so that no current can flow in the circuit of which these contacts 58—59 are a part, each contact being connected to the circuit by means of a corresponding conductor such as 60—61. The conductors may be wired to the corresponding parts of the circuit in any suitable manner, e. g., they may be conducted through suitable openings in the steering column with sufficient lag to provide for the rotation of the steering wheel.

Assuming, now, that the push button 50 is being depressed in order to signal the intention of making a left turn, the shaft 52 will slide along the opening on the bracket 55, and the contacts 58—59 will establish conductive relation with the corresponding portion of the metallic body of the shaft 52, thereby closing the signalling circuit of which these contacts are a part. The contacts are made of resilient material and, when the push button 50 is in operated position (depressed) the contacts 58—59 by their resiliency engage with the corresponding recessed or cut-out portions 65—66 on the shaft 52, and hold the shaft in depressed or operated position. Any other suitable and desirable provision may be employed for the purpose of making the switch mechanism self-locking as described.

The push button 51, provided for indicating and signalling a right turn, is equipped with a like switch and contact mechanism, as above described with reference to the push button 50, and is depressed when the driver intends to make a right turn prior to executing the change in direction of travel so as to warn oncoming or following cars of his intention to turn. It will be understood, of course, that the invention may be used with turn-indicating means merely attached to the rear of the automobile if desired; but, as will be described later on, turn-indicating means may also be provided in the front of the automobile so as to warn oncoming as well as following cars, as noted above.

Each switch shaft, such as 52—53, is provided at its lower end with a yielding or tilting member 70—71, respectively, suitably connected thereto as shown. Each of the yielding members carries a roller 72—73, respectively. A suitable biasing spring, shown for convenience as a leaf spring, indicated at 74 in Fig. 4, may be provided so as to hold the corresponding tilting members in straight position, with the axes 75—76 of the rollers 72—73 on a line with the pins 77—78, respectively, at the points where these members are attached to their shafts 52—53. With the push buttons and switch mechanisms in normal position, the rollers 72—73 are above the highest point of the cam 30 secured within the stationary lower casing 20.

Assuming, again, that the push button 50 is depressed as explained, and that the contact springs 58—59 (Fig. 4) have engaged the recessed portions 65 and 66 of the shaft 52, locking the switch shaft in actuated position, it follows that the circuit, which will be described later on in detail, is closed and the proper signal is being given. The roller 72 has been brought down from its normal position by the distance from the crimped portion of the contacts 58—59 to the recessed or cut-out portions 65—66 on the shaft 52. In this position the roller 72 will establish frictional contact with the cam 30 when the steering wheel is rotated. In order to make the left turn as signalled upon depressing the push button 50, the driver rotates the steering wheel in anti-clockwise direction, thereby carrying along the upper portion of the housing and with it the push button 50 and also the switch mechanism and its shaft 52 and attached roller 72. The signal, it is understood, is given from the moment the push button 50 is depressed and should be maintained in operation until the change in the direction of travel is accomplished. Therefore, while the steering wheel is rotated to execute the turn to the left, the signal must be properly maintained and must not be disturbed. This is accomplished by the tilting or yielding control member 70 attached to the shaft 52 in the manner previously described. When this member by its roller 72 establishes frictional contact with the cam 30 it trips or yields; the shaft 52 will remain in depressed position; and, since the contacts 58—59 engage the contact portions 65—66 on the shaft 52, the corresponding signalling circuit is maintained in operation. However, when the steering wheel is rotated back to normal after the desired turn has been executed, in order to return to the straight normal direction of travel, the mechanism is moved in the opposite direction; and, when the roller 72 engages the cam 30 frictionally during this return movement, it will not yield, but remains rigid, and therefore the rise of the cam effects a movement of the contact shaft upwardly to disengage the contacts 58—59 from the locking depressions or notches 65—66 to restore the push button from its actuated locked position to the normal position shown in Fig. 2.

The operations incident to depressing the push button 51, when it is desired to signal a right turn, are alike, but the sequence of operations with respect to the coaction of the yielding control member 71 and the cam 30 are, of course, reversed.

Figure 5:
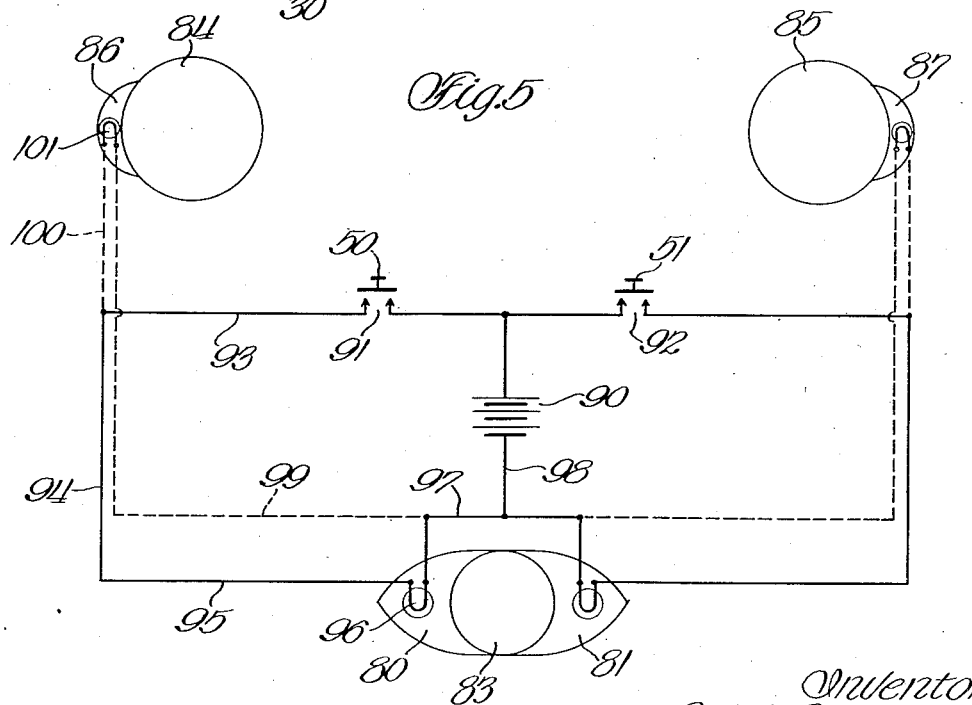
Fig. 5 is a simplified circuit diagram showing the electrical connections to the indicating and signalling lights secured to the automobile.

The signals proper may be made in the form of suitably colored lamps attached at suitable places in the rear or front of the car, or in both places if signalling is desired for oncoming as well as for following traffic. The rear signals may assume an arrow shape, such as diagrammatically indicated in Fig. 5 at 80—81. The light 80 is intended for signalling to the following traffic the intention to make a left turn, while the signal lamp 81 is provided for signalling the intention to make a right turn. Each lamp may be provided in a proper casing for simple attachment to the standard tail light 83. In case two tail lights are normally provided on an automobile, one on the left side and one on the right side, then the turn indicator 80 is, of course, secured to the left tail light, while the turn indicator 81 is secured to the right tail light. The headlights shown diagrammatically in Fig. 5 at 84 and 85 may also be equipped with direction-indicating lights, one diagrammatically shown at 86 attached to the left headlight 84, and the other shown at 87 secured to the right headlight 85. Each of these indicators may also be provided in a suitable casing and may assume any desired shape. It is understood, of course, that, instead of indicating lights, suitable mechanical means, e. g., semaphores or the like, may be provided for indicating the change in the direction of travel. In this case it is merely necessary to put the operating mechanism of such means in the circuit shown in Fig. 5 in place of the indicating lights described. If, however, lights are used for signalling and indicating, these lights may be provided in a circuit comprising, as shown in Fig. 5, the battery 90 and the switch mechanisms 91—92. Each of these switch mechanisms comprises a push button, such as 50 and 51, respectively, and may be of the general structure described previously.

Referring, now, to Fig. 5 and assuming again that the driver wishes to make a left turn, and also assuming that signalling means are provided only at the rear of the car, the following circuit will be closed when the push button 50 is depressed: from the negative terminal of battery 90 over the closed contacts of the corresponding switch 91, conductors 93—94—95, lamp 96, conductors 97—98 to the positive terminal of the battery 90. Lamp 96 lights and illuminates the arrow-shaped indicator 80, thus indicating to the following traffic that the driver wishes to make a left turn. In case the automobile is also equipped with a direction indicator, such as 86 attached to the headlight 84, the dotted circuit comprising the conductors 99 and 100 and the lamp 101 will be in parallel with the previously described circuit, and the indicator 86 signals to the oncoming traffic the intention of the driver to make a left turn. The operations incident to depressing the push button 51 to signal the intention of making a right turn are the same as described in connection with the left turn signalling. The circuit connections include identical parts and can be easily followed on the diagram Fig. 5. It should be noted that I have shown a complete conductive return circuit, chiefly for the purpose of convenient description. One terminal of the battery may, of course, be grounded in the customary manner.

The push buttons used in conjunction with my device may be given any desired shape. As shown in Fig. 1, I prefer to use a type of push button which is of an arcuate, somewhat elongated shape and pointed at one end so as to furnish not only a pleasing appearance which fits well into the general design of the apparatus and the standard parts to which it is attached, but which also furnishes by its shape an indication as to its purpose. The push button may be pointed at both ends if front and rear signalling is provided for.

What is considered new and desired to have protected by Letters Patent is particularly defined in the appended claims.

I claim as my invention:

1. In an automobile signalling device, the combination of a composite housing with switching means constituting a control apparatus which comprises a lower housing section consisting of a cup-shaped member which is centrally firmly attached to the stationary steering column and carries an upright peripheral wall forming an entirely free annular peripherally confined space around a portion of said column immediately below the spokes of the steering wheel mounted thereon, an arcuate cam member carried on the bottom portion of said lower housing section and projecting into the free space formed thereby, an upper housing section firmly attached to the rotatable steering wheel and having an annular depending flange overhanging the peripheral upright wall of said lower housing section in spaced relation thereto, and switching means in said upper housing section comprising an actuating member extending to the outside, an operating member connected to said actuating member and extending into said housing, electrical contacts mounted on said upper housing section and adapted to be conductively connected by said operating member, and release means for said switching means normally in alignment with said cam member and extending into the path of said cam member when the switching means is in actuating position.

2. In an automobile signalling device, a cup-shaped housing member having a central flanged opening therein, said member being divided along a diameter thereof into two parts so that it can be assembled on the steering column beneath the wheel, means for securing said parts together and for securing said flange to the steering column, a cover plate for said housing positioned above the wheel and secured to the spokes thereof, said plate having a central opening therein surrounding the hub of the wheel and having depending arcuate flanges projecting down between the spokes of the wheel into overlapping relation with the rim of the said housing member, right and left turn push buttons mounted 180° apart on said cover plate, each push button comprising a vertically slidable self-locking operating member and a pair of contact members adapted to be electrically connected by operation of said member, an unlocking cam secured to the bottom of said housing member on the inside thereof, and means included in each push botton for cooperation with said cam, each said means comprising a pivoted extension which is normally in prolongation of the operating member and is adapted to turn on its pivot in one direction only.

3. In an automobile signalling device, a housing comprising a cup-shaped portion secured to the steering column beneath the wheel and a cover portion above the wheel and secured to the spokes thereof, said cover portion having dependent arcuate flanges extending down into overlapping relation with the rim of said cup-shaped portion, right and left turn spring restored self-locking push buttons mounted 180° apart on said cover portion and extending downward into the housing, an arcuate cam inside the housing and comprising a curved leaf spring rigidly secured at one end to the bottom of the housing, means securing the other end of the spring in sliding relation to the housing to permit yielding of the spring in performance of its cam function, and means associated with each push button adapted to cooperate with said cam to effect unlocking of the push button responsive to restoration of the steering wheel after making a turn.

RALPH MARKHAM.